United States Patent
Bennett

(10) Patent No.: US 6,732,470 B1
(45) Date of Patent: May 11, 2004

(54) SINKER-SLIDER

(76) Inventor: Robert A. Bennett, 120 Sheffield Cir., Stratford, CT (US) 06614

( * ) Notice: Subject to any disclaimer, the term of this patent is extended or adjusted under 35 U.S.C. 154(b) by 0 days.

(21) Appl. No.: 10/303,503

(22) Filed: Nov. 25, 2002

(51) Int. Cl.[7] .............................................. A01K 91/00
(52) U.S. Cl. ......................... 43/44.9; 43/43.12; 43/17.2
(58) Field of Search ............................... 43/44.9, 44.91, 43/43.1, 43.12, 43.14, 43.15, 17.2; 24/572.1

(56) References Cited

U.S. PATENT DOCUMENTS

| | | | | |
|---|---|---|---|---|
| 2,187,991 A | * | 1/1940 | Tyler | 43/43.1 |
| 2,230,456 A | * | 2/1941 | Henze | 43/43.14 |
| 2,359,588 A | * | 10/1944 | Shea | 43/43.12 |
| 2,399,371 A | * | 4/1946 | Mendelson | 43/43.1 |
| 2,482,037 A | * | 9/1949 | Swaim | 43/17.2 |
| 2,534,790 A | * | 12/1950 | Moore | 43/17.2 |
| 2,597,229 A | * | 5/1952 | Cox | 43/17.2 |
| 2,627,691 A | * | 2/1953 | Bress | 43/17.2 |
| 2,760,810 A | * | 8/1956 | Smith | 294/66.1 |
| 2,761,235 A | * | 9/1956 | Payne | 43/17.2 |
| 2,809,460 A | * | 10/1957 | Taylor | 43/17.2 |
| 2,914,880 A | * | 12/1959 | Bussey | 43/17.2 |
| 2,915,845 A | * | 12/1959 | Hughes | 43/17.2 |
| 3,029,542 A | * | 4/1962 | Agostini | 43/17.2 |
| 3,735,520 A | * | 5/1973 | Jarrett | 43/17.2 |
| 3,763,590 A | * | 10/1973 | Meulnart | 43/43.11 |
| 3,769,734 A | * | 11/1973 | Winkler | 43/17.2 |
| 3,878,636 A | * | 4/1975 | George | 43/42.74 |
| 4,177,599 A | * | 12/1979 | Pettersen | 43/43.12 |
| 4,408,411 A | * | 10/1983 | Skarnells | 43/17.2 |
| 4,598,493 A | * | 7/1986 | O'Brien et al. | 43/17.2 |
| 5,150,540 A | * | 9/1992 | Bennett | 43/43.12 |
| 5,241,774 A | * | 9/1993 | Rayburn | 43/44.9 |

* cited by examiner

*Primary Examiner*—Peter Poon
*Assistant Examiner*—Joan M. Olszewski

(57) ABSTRACT

A first horizontal hollow cylinder open at both ends has a first narrow elongated slot. A second horizontal hollow cylinder open at both ends is disposed concentrically within the firtst cylinder and has a second narrow elongated slot that extends between its ends. A vertically elongated element is secured at its upper end to the first cylinder and has an opening intermediate its ends. A flexible elongated connector secured at one end to the lower end of the element with its other end being detachable with the element opening. A rotatable member is secured to one end of the second cylinder and is spaced from the first cylinder so that the member can rotate the second cylinder about its axis without rotating the first cylinder.

1 Claim, 4 Drawing Sheets

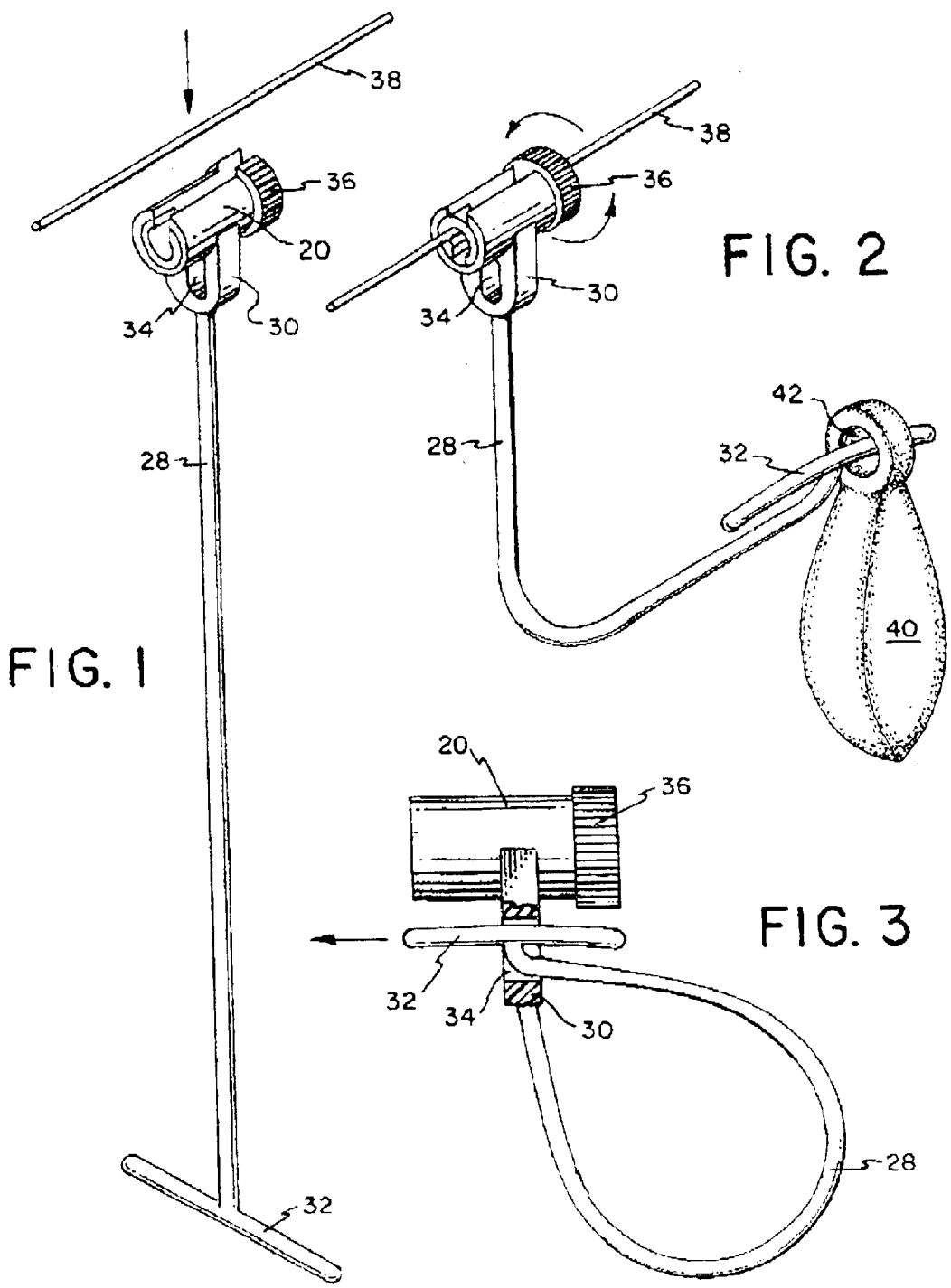

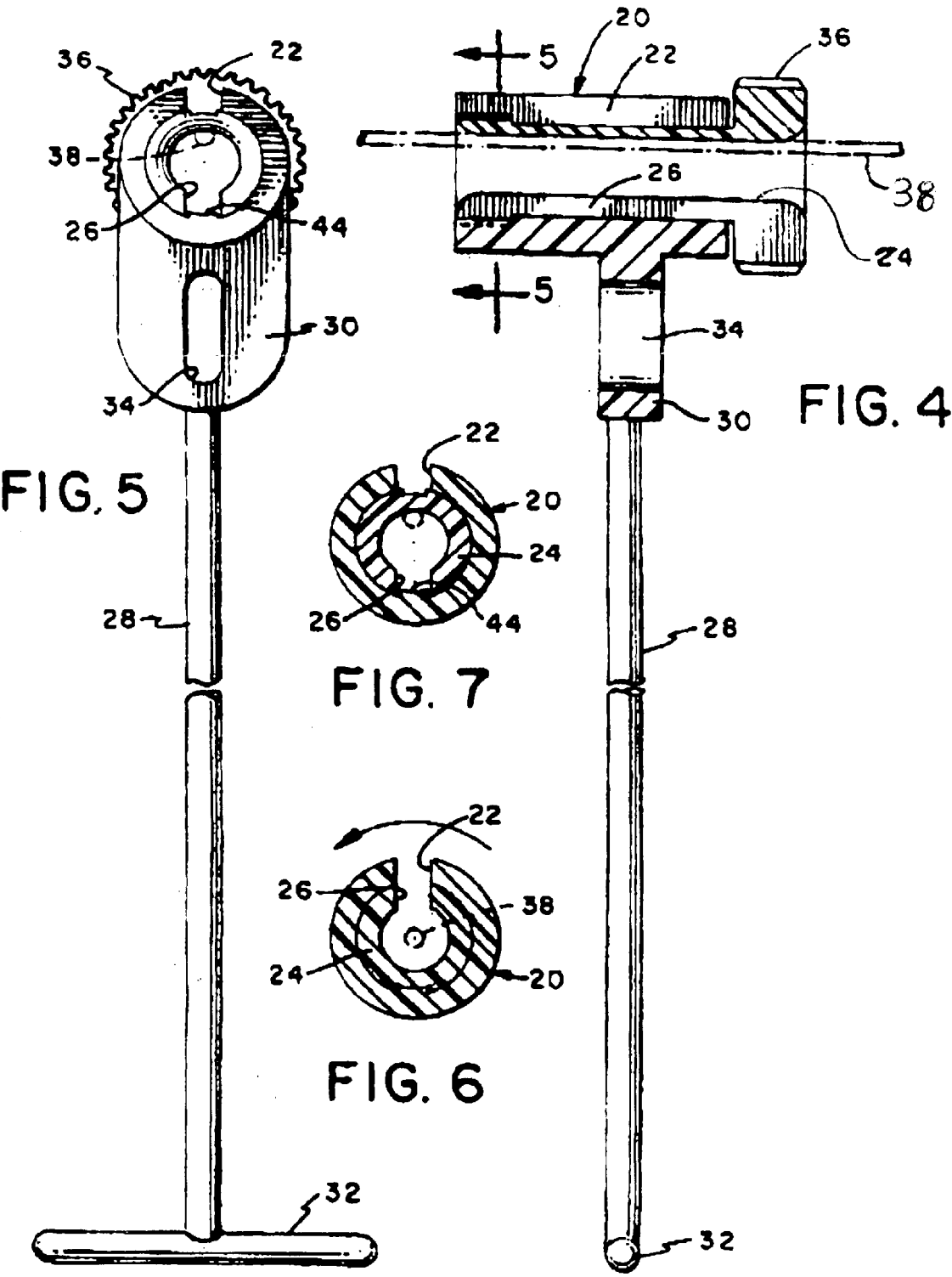

SINKER-SLIDER

BACKGROUND OF THE INVENTION

Sinker-slider are devices used by fishermen that comprise a hollow sliding device open at both ends through which a fishing line extends, a sinker, typically of lead, and an elongated connector engaged at one end to the device and tied by a knot at the other end to the sinker.

Conventionally, a fisherman wishing to install such device must first cut the line to provide a free end for insertion into the device. Similarly, once installed, the line carrying the device must be cut before the device can be removed.

Moreover, once a sinker has been installed, it can only be removed by untying the knot.

The present invention overcomes both of these problems by providing a new type of sliding device which can be installed on a line or removed from the line without cutting it and moreover utilizes a new type of connector which enables a sinker to be connected or disconnected from the connector without the use of knots or other securing arrangements.

SUMMARY OF THE INVENTION

In accordance with the principles of the invention, a plastic sinker-slider structure employs a first horizontal hollow cylinder open at both ends. The first cylinder has a first narrow elongated slot that extends between its ends that exposes the first cylinder interior.

A second horizontal hollow cylinder also open at both ends is disposed concentrically within and spaced from the first cylinder. The second cylinder has a second narrow elongated slot extending between its ends that exposes the second cylinder interior. The two cylinders can be locked together.

The sinker slider structure also employs an elongated flexible connector having first and second opposite ends and a vertical element having upper and lower ends. The element is secured at its upper end to the first cylinder and extends therebelow. The element is secured at its lower end to the first end of the connector. The element has an opening intermediate its ends. The second end of the connector is detachably securable in said member opening.

A rotatable member is secured to one end of the second cylinder and is spaced from the first cylinder so that the member can rotate the second cylinder about its axis without rotating the first cylinder that remains in fixed non-rotatable position. The member can be placed in first position of rotation at which the two slots are aligned and can be placed in a second position of rotation at which said slots are out of alignment. The cylinders can be locked together in either position of rotation.

In order to secure the sinker-slider to a fishing line, the member is placed in its first position so that the fishing line can be inserted through the aligned slots. The member is then placed in its second position so that the line is held in position within the second cylinder. As long as the slots are out of alignment, the sinker-slider remains secured to the line. The sinker-slider can be removed by placing the member in its first position and removing the line through the aligned slots.

Each sinker for use in this sinker-slider structure has a hole. In order to connect the sinker detachably to the structure, the second end of the connector is first is disconnected from the member opening. The free second end is then pulled through the hole in the sinker and then is detachably connected to the member opening.

If a fisherman finds that the sinker is caught in rocks or the like, the second end of the connector is released from the member opening and can be pulled through the hole in the sinker. The sinker remains caught and is discarded without any damage to the sinker-slider structure.

BRIEF DESCRIPTION OF THE DRAWINGS

FIG. 1 is a perspective view of a sinker-slider structure in accordance with the invention before a fishing line is inserted therein.

FIG. 2 is a view similar to FIG. 1 but showing the fishing line inserted and in addition showing the structure partially connected to a sinker.

FIG. 3 is a side view of the structure without a fishing line inserted and showing the connector secured at one end to the first cylinder and with the other end partially inserted into the member opening.

FIG. 4 is a side view in cross section of the structure of FIG. 1 before connection to a sinker.

FIG. 5 is a view taken along line 5—5 in FIG. 4.

FIG. 6 is a detail cross section of the two cylinders with the fishing line inserted and the two slots aligned.

FIG. 7 is a view similar to FIG. 6 but showing the slots out of alignment.

DETAILED DESCRIPTION OF PREFERRED EMBODIMENTS

Figure 8:
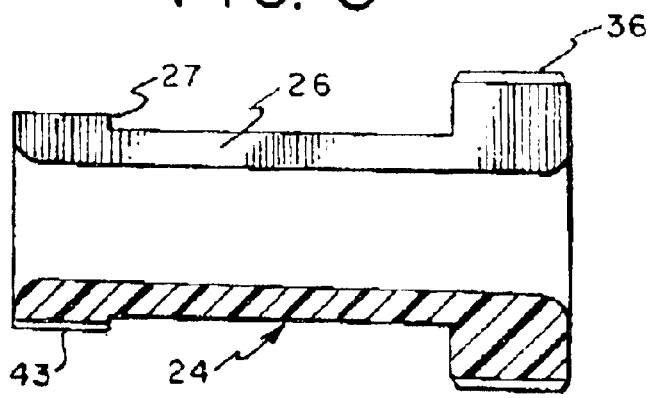
FIG. 8 is a side view in cross section of the second cylinder.
Figure 8A:
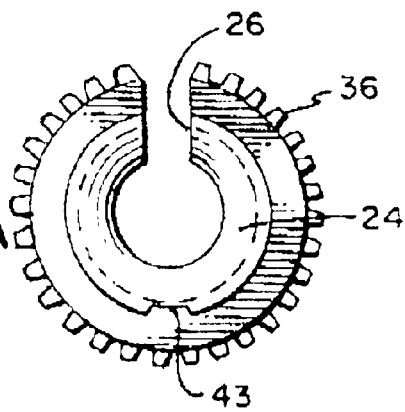
FIG. 8A is a detail cross sectional view showing the slots locked in alignment.
Figure 10:
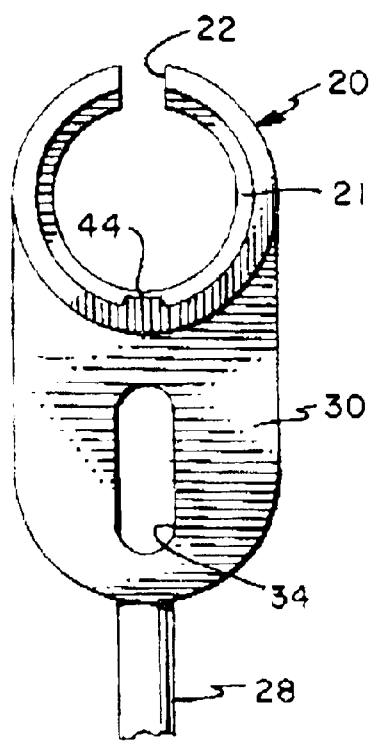
FIG. 10 is an end view of the structure with the element connected to the first cylinder.
Figure 9:
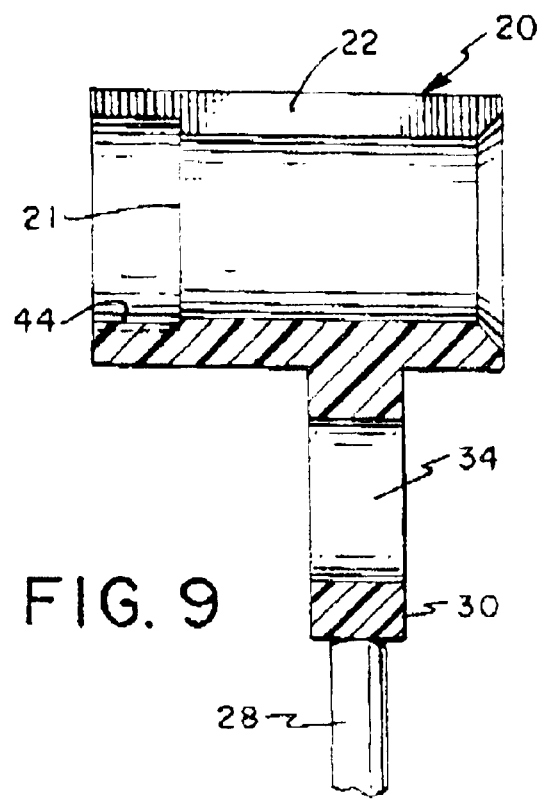
FIG. 9 is a side view in cross section of the first cylinder and member.
Figure 11A:
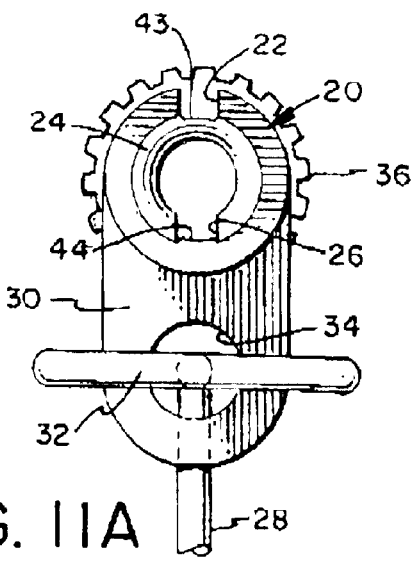
FIG. 11A is a front view of the structure shown in FIG. 11.
Figure 11:
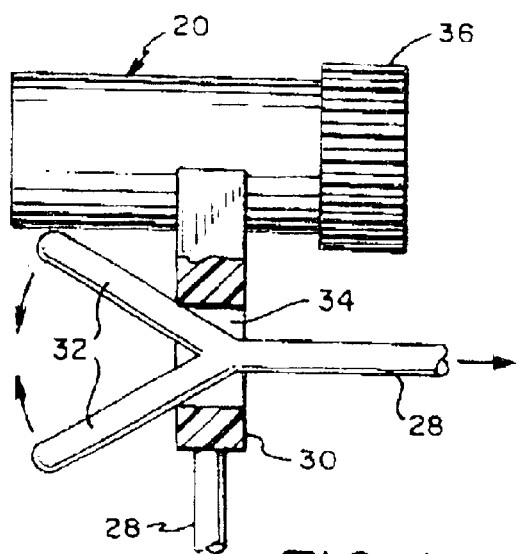
FIG. 11 is a side view of the structure shown in FIG. 10.
Figure 12:
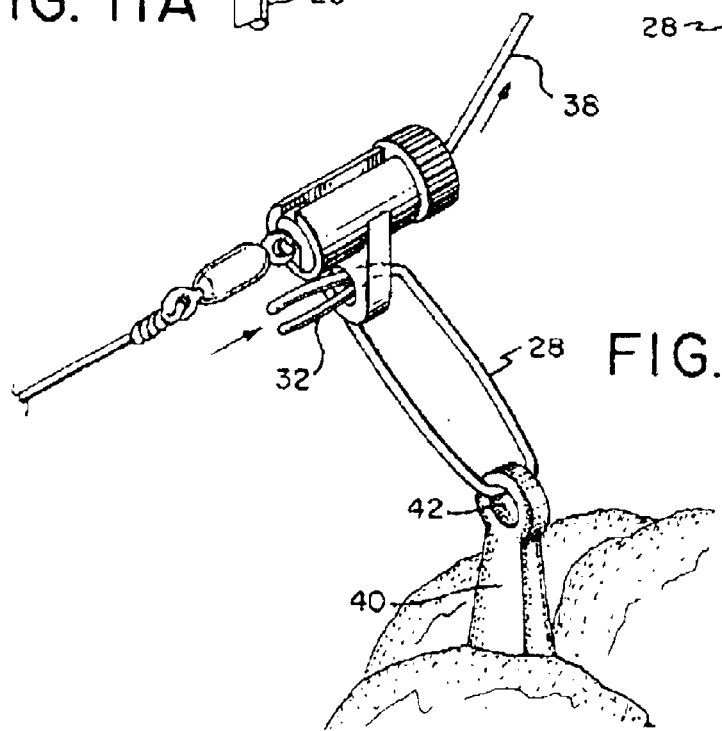
FIG. 12 is a perspective view of the sinker-slider structure secured to a sinker which is trapped in rocks.

Referring now to FIGS. 1–12, the plastic sinker-slider structure employs a first horizontal hollow cylinder 20 open at both ends. The first cylinder has a first narrow elongated slot 22 that extends between its ends that exposes the first cylinder interior.

A second horizontal hollow cylinder 24 also open at both ends is disposed concentrically within and spaced from the first cylinder. The second cylinder has a second narrow elongated slot 20 extending between ends that exposes the second cylinder interior. Cylinder 24 is rotatably locked to cylinder 26 when inserted therein so that the raised end of cylinder 24 has a lip 27 which snap locks into wall 21 of cylinder 20.

The sinker slider structure also employs an elongated flexible connector 28 having first and second opposite ends and a vertical elongated element 30 having upper and lower ends. The element is secured at its upper end to the first cylinder and extends therebelow. The element is secured at its lower end 32 to the first end of the connector. End 32 defines in combination with the body of the element a flexible T shaped structure. The element has an opening 34 intermediate its ends. The end 32 of the connector is detachably securable in said member opening.

A rotatable member 36 is secured to one end of the second cylinder and is spaced from the first cylinder so that the member can rotate the second cylinder about its axis without rotating the first cylinder that remains in fixed non-rotatable position. The member can be placed in first position of rotation at which the two slots are aligned and can be placed in a second position of rotation at which said slots are out of alignment.

In order to secure the sinker-slider to a fishing line 38, the member is placed in its first position so that the fishing line 38 can be inserted through the aligned slots. The member is then placed in its second position so that the line is held in position within the second cylinder. As long as the slots are out of alignment, the sinker-slider remains secured to the line. The sinker-slider structure can be removed by placing the member in its first position and removing the line through the aligned slots.

Each sinker 40 for use in this sinker-slider structure has a hole 42. In order to connect the sinker detachably to the structure, the end 32 of the connector is first is disconnected from the member opening. The free end 32 is then pulled through the hole in the sinker and then is detachably connected to the member opening.

If a fisherman finds that the sinker is caught in rocks or the like, the end of the connector is released from the member opening and can be pulled through the hole in the sinker. The sinker remains caught and is discarded without any damage to the sinker-slider structure.

The first cylinder 20 has a raised shallow ledge 44 on its inner wall disposed in opposite position to its slot 22. When the slots are out of alignment, the slot 26 of the second cylinder is rotated to engage the ledge and thus lock the line in position. When the slots are aligned, notch 43 in the second cylinder engages ledge 44 to lock the slots in position. Further rotation of the member can provide an unlocking action if desired.

While the invention has been disclosed with particular reference to the drawings, the protection desired is to be limited only by the terms of the claims that follow.

What is claimed is:

1. A plastic sinker-slider structure comprising:

a first horizontal hollow cylinder open at both ends, said first cylinder having a first narrow elongated slot that extends between its ends and exposes the first cylinder interior;

a second horizontal hollow cylinder open at both ends and disposed concentrically within and spaced from the first cylinder, said second cylinder having a second narrow elongated slot that extends between its ends and exposes the second cylinder interior; each end of said second cylinder being aligned with a corresponding end of said first cylinder;

a vertical elongated element secured at an upper end to said second cylinder and having a lower end extending therebelow, said element having an opening intermediate its ends;

a flexible elongated connector secured at one end to the lower end of the element, the other end of said connector being detachably securable with said element opening; and a rotatable member secured at one end of the second cylinder and spaced from the first cylinder so that the member can rotate the second cylinder about its axis without rotating the first cylinder that remains in fixed non-rotatable position, said member having a first position of rotation at which the two slots are aligned and a second position of rotation at which said slots are out of alignment;

the first cylinder having a raised ledge secured to its inner surface and disposed opposite the first slot, the second slot engaging said ledge when the member is in the second position, the second cylinder having a notch which engages said ledge to lock the slots in the first position.

* * * * *